Sept. 9, 1969

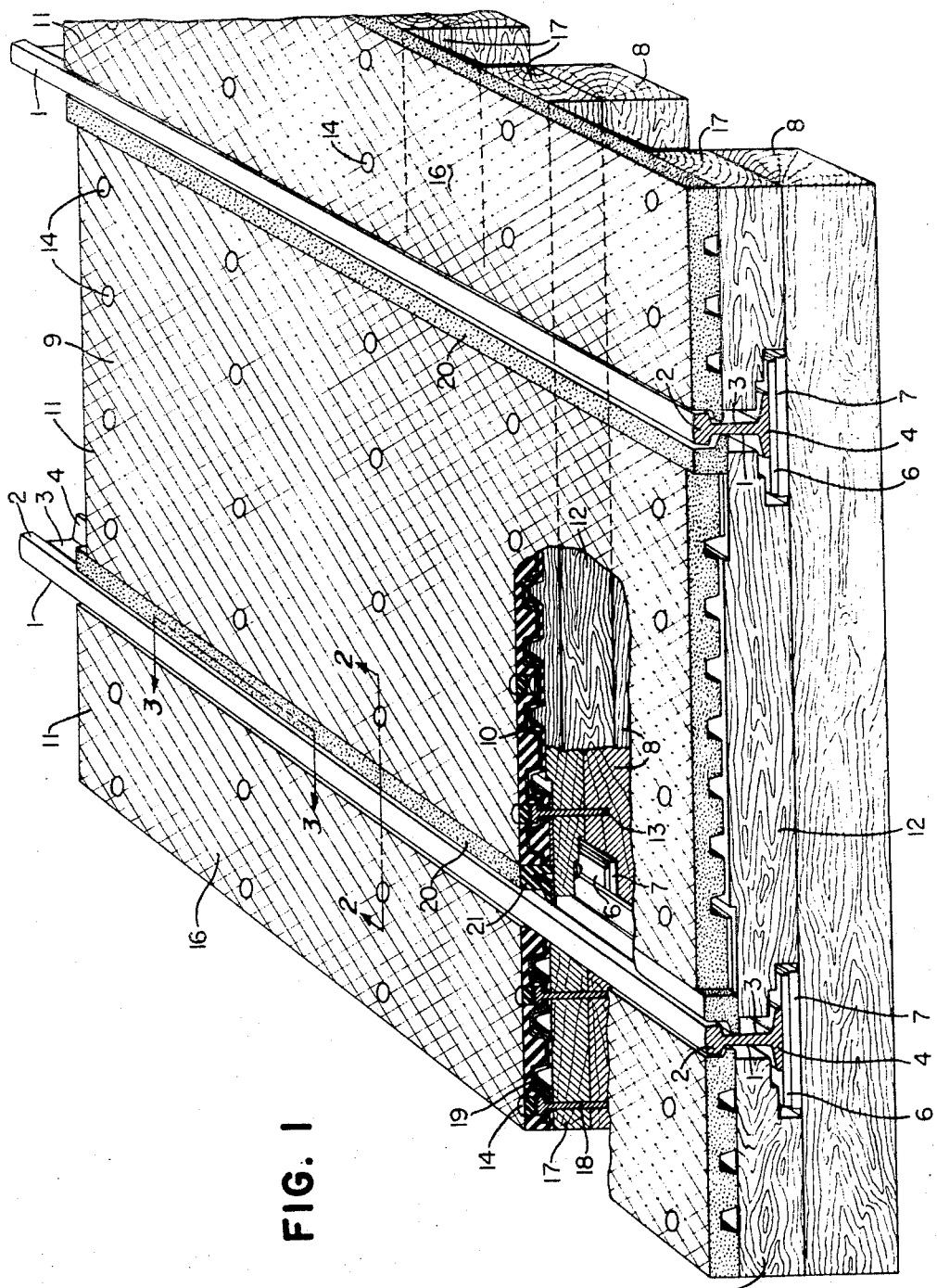

E. CAILLET ET AL 3,465,963

CROSSING STRUCTURE

Filed Dec. 29, 1967

INVENTORS
EUGENE CAILLET
BYRON L. FISHBAUGH
BY

*R. H. Hatton*
ATTORNEY

United States Patent Office 3,465,963
Patented Sept. 9, 1969

3,465,963
CROSSING STRUCTURE
Eugene Caillet and Byron L. Fishbaugh, St. Marys, Ohio, assignors to The Goodyear Tire & Rubber Company, Akron, Ohio, a corporation of Ohio
Filed Dec. 29, 1967, Ser. No. 694,586
Int. Cl. E01b 7/28
U.S. Cl. 238—8　　　　　　　　　　　　　　9 Claims

ABSTRACT OF THE DISCLOSURE

An improved railway-roadway crossing structure having a smooth uninterrupted crossing deck between the rails as well as immediate area adjacent the outside of the rails. The deck comprises center and side crossing pads of elastomeric material and an improved elastomeric filler strip adjacent the inside of each rail. The filler strip includes a plurality of recesses to facilitate compression under the passage of flanged railroad wheels and is securely anchored to provide uniform deflection under identical loads. The filler strips are designed for use with the elastomeric pads but may also be used in conventional crossing structures. This crossing structure allows small-wheeled vehicles to pass transversely over the rails without shock or damage thereto.

BACKGROUND OF THE INVENTION

This invention relates to an improved railroad crossing structure and, more specifically, to a crossing structure having a resilient smooth uninterrupted crossing deck between the rails as well as the immediate area adjacent the outside of the rails and also includes an improved filler strip adjacent the inside of each rail.

It has long been recognized that when vehicles of all kinds travel across railroad tracks, they receive, as a result, a more or less severe shock or jolt. Depending upon the type of vehicle involved and the condition of the crossing structure, this shock may cause extensive damage to the vehicle. For example, automobiles traveling across an extremely rough railroad crossing surface may, as a result thereof, be substantially damaged. An even more frequent occurrence in this regard, and the principal concern of this invention, is the damage to small-wheeled vehicles of the type primarily used in large industrial facilities as they cross the in-plant crossings in the normal factory operations; for instance, battery-driven tractors or lift trucks having solid rubber tires. These in-plant vehicles receive an especially severe jolt each time due to their small-diameter tires dropping into the space or so-called wheel flangeway gap adjacent the inside of each rail which ultimately causes considerable damage to both the vehicle wheels and frame structure. Maintenance costs are consequently quite high. This condition also frequently results in spoilage or breakage of the material being hauled by these vehicles. This situation obviously indicates the need for a smooth uninterrupted traffic crossing surface to eliminate or significantly reduce the jolt received by these crossing vehicles.

Various structures have been devised in an attempt to combat this problem. For example, resilient slabs of elastomeric material have been placed between and in the immediate area adjacent the outside of the rails as disclosed in Rennels United States Patents Nos. 2,828,079 and 2,828,080. In addition, Goulding United States Patent No. 2,835,451 and Speer United States Patent No. 2,950,057 describe elongated elastomeric filler strips of various shapes which are placed in the space adjacent the inside of each rail with the primary object of providing a suitable crossing surface in this area.

However, these previously mentioned structures have had shortcomings of one sort or another. The resilient slab, for example, in and of itself does not provide a substantially unbroken crossing surface between the rails because of the wheel flangeway gap adjacent the inside of the rails and, thus, the small-wheeled vehicles are subjected to considerable shock as they cross the gap. This crossing structure also allows undesirable debris to accumulate in the space adjacent the inside of the rails.

The previous filler strips have also had various disadvantages. For instance, the design of some of the strips does not permit easy or controlled compression or deflection of the elastomeric portion of the strip when it contacts the flange of a railroad wheel so as not to interfere with the passage of the rail vehicle. In some instances, a derailment may result because the elastomeric material does not yield sufficiently as the wheels pass. Furthermore, previous filler strips have not been sufficiently anchored to prevent varying deflections under identical loads due to the different types of surfaces against which the rubber strips rest or the conditions of these surfaces and the method and extent of anchoring. Some of these previous designs also allow dirt and ice to accumulate which change the load deflection characteristics of the filler strip and result in uncontrolled rubber deflection under the weight of flanged railroad wheels.

Another major disadvantage with many of the existing filler strips is the varying installation procedures necessary to accommodate various crossing constructions. It should also be noted that even though the filler strip provides a smooth surface in the limited area in which it is positioned, the smoothness in the remainder of the crossing surface will depend upon the condition of the various materials used for the construction of the crossing bed, such as concrete, asphalt, or wood. Therefore, the initial shock may be reduced but the particular crossing surface may still be uneven and bumpy causing damage to the vehicle.

It has been determined that these problems can be far more adequately solved by providing an improved smooth uninterrupted railway-railroad crossing in which the entire distance between and in the immediate area adjacent the outside of the rails is filled with a resilient yieldable material such as rubber or the like. This invention discloses such a crossing structure utilizing resilient center crossing pads and preferably side crossing pads in combination with resilient filler strips adjacent the inside of each rail which are securely anchored and form an integral part of the crossing structure. Since the filler strips are specifically designed for use with the crossing pads, easy and uniform installation is permitted.

Moreover, the filler strip of this invention is of a superior design containing a plurlaity of recesses intermittently spaced the length thereof, thereby providing a sufficiently rigid structure to support the weight of crossing vehicles, withstand the passage of railroad wheels, and still permit easy deflection. Since these recesses are located within the filler strip and face downwardly, objectionable substances will not accumulate.

OBJECTS OF THE INVENTION

A primary object of this invention is to provide an improved railway-roadway crossing structure having a resilient smooth uninterrupted crossing surface to permit the passage of vehicles of all types with a minimum of shock or damage thereto.

Another principal object of this invention is to provide an improved filler strip to fill the space adjacent the inside of the rails and to impart uniform load-carrying capacity by preventing varying deflections under identical loads.

Another important object of this invention is to provide a filler strip which will permit uniform installation procedures in conjunction with established elastomeric crossing pads and yet be easily modified to accommodate various other crossing constructions.

Still another important object of this invention is to provide an improved filler strip design which provides a structure sufficiently rigid to support the weight of crossing vehicles, withstand the passage of flanged railroad wheels, and still permit easy deflection to insure against possible derailments.

A still further object of this invention is to provide an improved filler strip design which prevents the accumulation of objectionable substances adjacent the inside of the rails.

Other objects and advantages of this invention will become apparent hereinafter as the description thereof proceeds, the novel features, arrangements and combinations being clearly pointed out in the specification as well as the claims thereunto appended.

BRIEF DESCRIPTION OF THE DRAWINGS

FIG. 1 is a perspective view with parts broken away showing the crossing structure of this invention;

DESCRIPTION OF THE PREFERRED EMBODIMENTS

Figure 2:
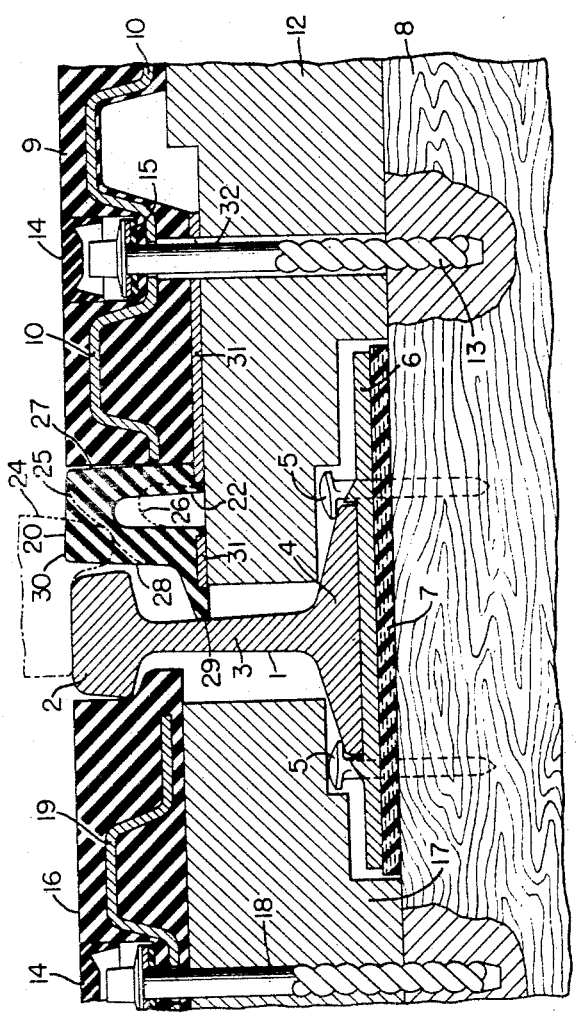
FIG. 2 is a sectional view taken substantially through 2—2 of FIG. 1.

FIGS. 1 and 2, as illustrated, show a railroad crossing structure comprising a pair of rails 1 having heads 2, intermediate webs 3 and bases 4 mounted on a supporting structure. For example, rail spikes 5 securing the rail bases 4 may be driven through tie plates 6, tie pads 7, and into crossing tie 8.

Center crossing pads 9 in the form of rectangular slabs of resilient material, usually an elastomeric material such as rubber or the like, are placed transversely between the rails 1. Although any of the well-known elastomeric materials may be used for this purpose, the best results will be attained with a synthetic elastomeric material which is abrasion and corrosion resistant. The particular elastomer for this application should be compounded to have a Shore A durometer hardness in the general range of 50 to 70.

Preferably, pads 9 contain a longitudinally corrugated reinforcing element 10, such as a steel plate, embedded therein to provide the required rigidity. The reinforcing element 10 terminates just short of the edges of the pad 9 to allow free compression. The top surface of the center pads 9 preferably includes a plurality of channels to form, for example, a diamond design 11 on the surface which provides an improved traction surface as well as means for draining the surface. The surface length of the individual pads 9, perpendicular to the rails 1, normally is somewhat less than the standard distance between the rails 1. The surface width of the individual pads 9 is usually 36 inches. The pads 9, therefore, typically may be installed in three-foot increments with the number of pads required depending upon the dimensions of the particular crossing involved. This arrangement provides versatility and facilitates the installation procedure for various size crossings.

The edges of the center pads 9 terminate short of the rails 1 to provide an opening for the passage of the flanges of the railroad wheels on the inside of each rail. As a result, a space is defined between the rail 1 and the edge of the pad 9 adjacent thereto. The center pads 9 are supported by a center shim frame 12 positioned on each tie 8 and attached thereto; for example, by means of galvanized drive spikes 13. Incidentally, elastomeric plus 14 are placed in the bolt holes through which the spikes 13 are driven in order to provide an entirely smooth crossing surface. In addition, the spikes 13 are tensionized with a rubber washer assembly 15 that is designed to keep them securely anchored.

It is also desirable in most applications to position side crossing pads 16, of similar design and composition to that of the center crossing pads 9, in the immediate area adjacent the outside of each rail 1 to complete the crossing structure and provide maximum protection for the crossing vehicles. Since the flange of the railroad wheel passes on the inside of the rail only, the flange-way gap is not necessary adjacent the outside of each rail 1 and the side pads 16 may be placed in a close abutting relationship to the rail head 2 and intermediate web 3. The side pads 16 are similarly supported by side shim frames 17 and crossing ties 8 and attached by means of drive spikes 18. Preferably, the side pads 16 also contain a corrugated reinforcing plate 19. Typically, the individual side pads 16 extend for a short distance outwardly from the rail heads 2 at right angles thereto and like the center pads 9 have a width of 36 inches to standardize installation procedures.

Elongated filler strips 20 having a body portion 21, preferably of elastomeric material, are positioned adjacent the inside of each rail 1 substantially filling the space between the rails 1 and the ends of the center pads 9. As in the case of the center pads 9 and the side pads 16, it is recommended that the body portion 21 be composed of an abrasion and corrosion resistant elastomeric material having a Shore A durometer hardness range of 50 to 70.

Figure 3:
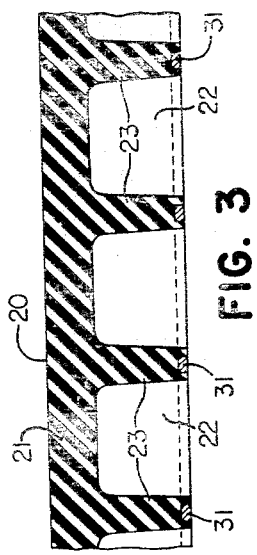
FIG. 3 is a sectional view taken substantially through 3—3 of FIG. 1.

The elastomeric body portion 21 of the strips 20 contains a plurality of recesses 22 and connecting webs 23 (shown in FIG. 3) therebetween, preferably extending uniformly along the length thereof to facilitate and control the compression of the strips 20 caused by the passage of the flanged wheels (represented by dotted lines 24 in FIG. 2) longitudinally along the rail. In FIG. 2, the dotted lines 25 and 26 represent the deformation of the elastomeric body portion 21 when depressed by the passage of flange wheel 24. The body portion 21 and recesses 22, of course, may be of various shapes and designs, but it has been determined that an elongated body portion of a generally inverted U-shaped cross section with connecting webs at intervals along the length gives a very satisfactory performance. Preferably, the outer peripheral cross sectional configuration of the strips 20 is essentially rectangular to provide for substantially complete filling of the spaces between the rail and crossing pad 9. This can be more clearly seen in FIG. 3 showing the elastomeric body portion 21 of the filler strip 20 containing recesses 22 and the connecting webs 23 therebetween. This design provides a sufficiently rigid structure to support the weight of a crossing vehicle, not be damaged by the passage of the flanged wheels of the railroad cars, and still permit easy deflection of the strip 20 to insure against possible derailments. The design also prevents any significant accumulation of objectionable substances in the space adjacent the inside of the rails 1. It should also be noted in FIG. 2 that the inside surface 27 of the body portion 21 abuts the outside edge of the center pad 9, and a flange portion 29 extends from adjacent the bottom of the opposite surface 28 of strips 20 so as to abut the web 3 of rail 1. This configuration allows the strips 20 to be positively positioned to fit the space or opening adjacent the inside of the rail 1. Preferably, it is desirable that the edge portion 30 of the filler strip 20 adjacent the rail head 2 be slightly elevated above the top surface of the rail head 2 to provide a relatively uninterrupted surface for contact with the small-diameter wheels of the crossing vehicle.

The filler strip 20 is anchored to the crossing structure by means of plate 31 which is embedded in the bottom of the body portion 21 to support the strip 20 and includes a projecting portion along one edge to extend transversely under a portion of the center pad 9. Although various means of assembling the body portion 21 and plate 31 together may be employed, this is most satisfactorily accomplished by molding the body portion 21 and plate 31 under heat and pressure to form a bonded unitary structure. Spike holes 32 in the steel plate 31, preferably so as to register with those of the crossing structure, provide a convenient means of anchoring the filter strip along the crossing structure.

Figure 5:
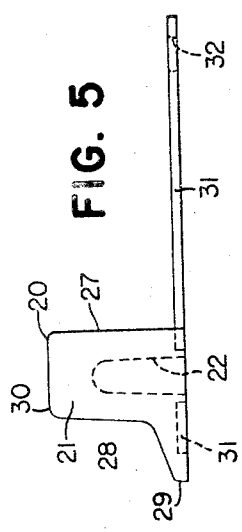
FIG. 5 is a side view of the filler strip of this invention.
Figure 4:
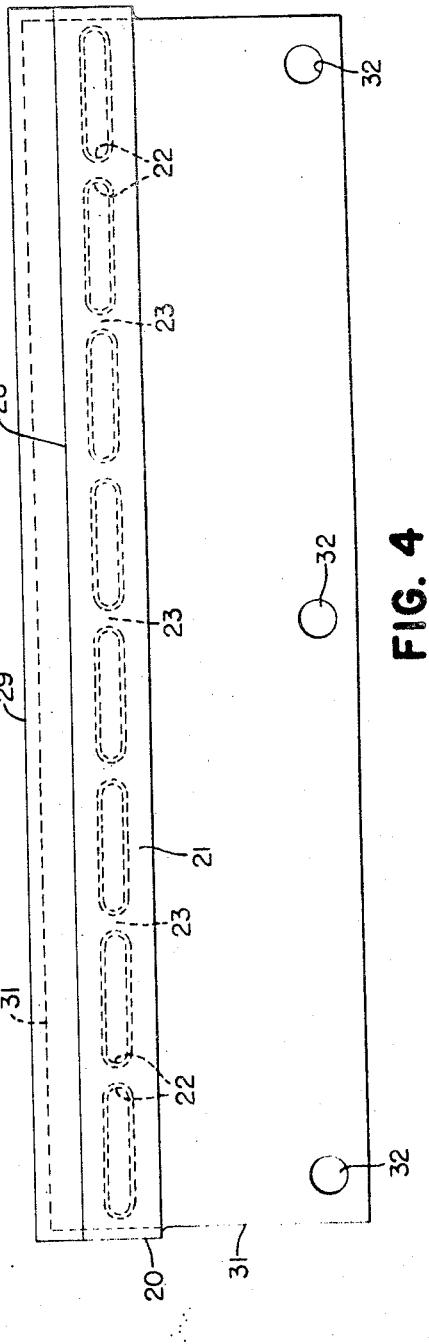
FIG. 4 is a plan view of the filler strip of this invention.

The preferred form of the filler strip 20 is best illustrated in FIGS. 3, 4 and 5. As is seen in FIGS. 4 and 5, the strip 20, which extends longitudinally adjacent the inside of each rail substantially the full length of the particular crossing structure involved, is an entirely unitary construction with the one large plate 31 being bonded to the filler strip body portion 21 and having spike holes 32 spaced longitudinally thereof. The recesses 22 and webs 23 therebetween extend the entire length of the body portion 21. The inverted U-shaped recesses 22 extend into the body 21 toward the upper surface and preferably plate 31 includes openings aligned with recesses 22. Strip 20 also includes flange portion 29 of elastomeric material projecting from beyond the side of strip 20 opposite that from which the projecting portion of plate 31 extends. By positively anchoring the strip 20 in this way, uniform load-carrying capacity is possible and uniform deflection results under identical loads.

Referring again to FIGS. 1 and 2, the filler strip 20 is supported by the center shim frames 12 and cross ties 8 and attached in combination with center pads 9. For example, this may be accomplished by means of galvanized drive spikes 13 through the center pads 9, the reinforcing element 10, the spike holes 32 of the plate 31, and the center shim frames 12 into the cross ties 8. In this way, the filler strip 20 and center pad 9 are assembled in a unified crossing structure. The center shim frames 12 are of a size and shape to support the strips 20 and pads 9 with their top surfaces lying in approximately the same plane as the top surfaces of the rail heads 2. This provides a smooth uninterrupted traffic crossing surface between the rails 1. Similarly, the side shim frames 17 support the side pads 16 so that the top surfaces thereof are also approximately in this same plane to provide a smooth surface in the immediate area adjacent the outside of the rails 1. Consequently, an entirely smooth uninterrupted traffic crossing surface is thereby provided. It should be apparent from the foregoing description that a crossing structure is provided which will permit uniform installation techniques and may be readily modified to accommodate various crossing constructions.

It should also be apparent to those skilled in the art that the particular filler strip of this invention may be advantageously used with other crossing constructions having crossing beds composed of materials such as concrete, asphalt or wood. Furthermore, the filler strip may be placed both on the inside or outside of the rail depending upon the particular crossing structure installation.

While certain representative embodiments and details have been shown for the purpose of illustrating the invention, it will be apparent to those skilled in the art that various changes and modifications may be made therein without departing from the spirit or scope of the invention.

What is claimed is:

1. An improved railroad crossing structure comprising in combination:
    (A) supporting means to provide support for the crossing structure,
    (B) at least a pair of spaced rails mounted thereon, over which the railroad vehicles travel with each rail including
        (1) a head
        (2) an intermediate web, and
        (3) a base, and
    (C) a resilient yieldable crossing deck disposed between any said pair of rails and attached to said supporting means, said deck having the improvement which comprises the combination of
        (1) a center pad of resilient elastomeric material containing a resinforcing element embedded therein, said pad extending transversely between the rails with the edges of the pad terminating short of the rails so as to define a space on the inside of each rail between the rail and the edge of the pad adjacent thereto,
        (2) an elongated filler strip in the space between the rail and edge of the center pad, said strip comprising
            (a) a body portion of resilient elastomeric mafterial extending longitudinally of the rails and substantially filling the space between the rail and the edge of the pad, said elastomeric body portion containing a pluraility of recesses therein spaced along the length thereof to facilitate compression of the strip by the flange of the railroad vehicle wheel as it passes over the crossing structure, and
            (b) anchoring means permanently adhered to the bottom of said elastomeric body portion for positioning the filler strip on the supporting means of said crossing structure to provide uniform load deflection characteristics, and
        (3) attaching means passing through said center pad, anchoring means and supporting means thereby connecting the strips and pad to form a unified crossing structure, the top surfaces of said pad and the body portion of said strip being in approximately the same plane with the top surface of the rail head whereby a smooth uninterrupted traffic crossing surface is formed so as to be substantially free of openings along the inside of the rails and thus allow small-wheeled vehicles to pass transversely over said rail heads without shock or damage thereto.

2. An improved railroad crossing structure as claimed in claim 1 which includes side pads of elastomeric material positioned in the immediate area adjacent the outside of each rail in substantially abutting relation thereto, thereby completing the crossing deck.

3. The improvement as claimed in claim 1 wherein each body portion of the strip in the area containing the recesses has an essentially inverted U-shaped cross section and in the web area between the recesses an essentially rectangular cross section, said recesses intermittently spaced along the length thereof, the portion of the upper surface of said strip adjacent the outside edge of the pad being substantially flush therewith, and at least another portion of the top surface of the strip being slightly above the top surface of the rail head so as to allow contact with the small wheels of the crossing vehicle, and a flanged portion outwardly extending from one edge of the bottom of the body portion to abut the adjacent rail web.

4. The improvement as claimed in claim 1 wherein the anchoring means is a metal plate embedded in the bottom of the body portion of the strip, said plate extending longitudinally of the rails and body portion and transversely inwardly from said body portion under at least the end portion of the center pad adjacent thereto.

5. The improvement as claimed in claim 4 wherein the elastomeric body portion and metal plate are molded into an integral structure and supported by a shim frame positioned on and attached to the supporting means.

6. An improved railroad crossing structure comprising in combination:
    (A) supporting means to provide support for the crossing structure,
    (B) at least a pair of spaced rails mounted thereon over which the railroad vehicles travel with each including
- (1) a head
- (2) an intermediate web, and
- (3) a base, (C) a crossing bed disposed between said rails and attached to said supporting means with the edge of the bed terminating short of the rails so as to define a space on the inside of each rail between the rail and the edge of the bed adjacent thereto, and (D) the improvement comprising elongated filler strips adjacent the inside of each rail comprising
- (1) a resilient elastomeric body portion extending longitudinally of the rails and substantially filling the space between the rail and the edge of the bed to substantially the height thereof, said body portion containing a plurality of recesses intermittently spaced along the length thereof to facilitate compression of the strip caused by the flange of the railroad vehicle wheel as it passes over the crossing, and
- (2) anchoring means permanently adhered to the bottom of said elastomeric body portion and including means for attaching to said supporting means thereby firmly anchoring the strip to retain it in position when subjected to both rail and crossing traffic.

7. The improvement as claimed in claim 6 wherein the cross-sectional configuration of the strip in the area containing the recesses is of an inverted U-shaped cross section with the configuration otherwise being substantially rectangular, said recesses being uniformly spaced along the length thereof, the portion of the upper surface of said strip adjacent to the outside edge of the bed being substantially flush therewith, and at least another portion of the top surface of the strip being slightly above the top surface of the rail head so as to allow contact with the small wheels of the crossing vehicle, and a flanged portion outwardly extending from one edge of the bottom of the body portion to abut the adjacent rail web.

8. The improvement as claimed in claim 6 wherein the anchoring means is a metal plate embedded in the bottom of the body portion of the strip, said plate extending longitudinally of the rails and body portion and transversely inwardly from said body portion for attachment to the crossing bed.

9. The improvement as claimed in claim 8 wherein the elastomeric body portion and metal plate are molded into an integral structure and supported by a shim frame positioned on and attached to the supporting means.

References Cited

UNITED STATES PATENTS

| | | | |
|---|---|---|---|
| 2,828,080 | 3/1958 | Rennels | 238—8 |
| 2,950,057 | 8/1960 | Speer | 238—8 |

ARTHUR L. LA POINT, Primary Examiner

RICHARD A. BERTSCH, Assistant Examiner